United States Patent
Wenzel et al.

(10) Patent No.: US 10,586,398 B2
(45) Date of Patent: Mar. 10, 2020

(54) MEDICAL IMAGE EDITING

(71) Applicant: KONINKLIJKE PHILIPS N.V., Eindhoven (NL)

(72) Inventors: Fabian Wenzel, Hamburg (DE);
Thomas Heiko Stehle, Hamburg (DE);
Carsten Meyer, Hamburg (DE);
Lyubomir Georgiev Zagorchev, Burlington, MA (US); Jochen Peters, Norderstedt (DE); Martin Bergtholdt, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/537,360

(22) PCT Filed: Dec. 7, 2015

(86) PCT No.: PCT/IB2015/059393
§ 371 (c)(1),
(2) Date: Jun. 16, 2017

(87) PCT Pub. No.: WO2016/097920
PCT Pub. Date: Jun. 23, 2016

(65) Prior Publication Data
US 2018/0005455 A1    Jan. 4, 2018

Related U.S. Application Data

(60) Provisional application No. 62/093,444, filed on Dec. 18, 2014.

(51) Int. Cl.
*G06T 19/20* (2011.01)
*G06T 17/20* (2006.01)

(52) U.S. Cl.
CPC ............ *G06T 19/20* (2013.01); *G06T 17/205* (2013.01); *G06T 2200/24* (2013.01); *G06T 2210/41* (2013.01); *G06T 2219/2021* (2013.01)

(58) Field of Classification Search
USPC ........................................................ 345/420
See application file for complete search history.

(56) References Cited

U.S. PATENT DOCUMENTS

| 7,443,393 B2 | 10/2008 | Shen et al. |
| 7,843,427 B2 | 11/2010 | Ording |

(Continued)

FOREIGN PATENT DOCUMENTS

| EP | 1791087 A1 | 5/2007 |
| JP | 7057113 | 3/1995 |

(Continued)

OTHER PUBLICATIONS

Yushkevich, et al., "User-guided 3D active contour segmentation of anatomical structures: Significantly improved efficiency and reliability", NeuroImage 31 (2006) pp. 1116-1128.

*Primary Examiner* — Kimbinh T Nguyen

(57) ABSTRACT

The present invention relates to medical image editing. In order to facilitate the medical image editing process, a medical image editing device (50) is provided that comprises a processor unit (52), an output unit (54), and an interface unit (56). The processor unit (52) is configured to provide a 3D surface model of an anatomical structure of an object of interest. The 3D surface model comprises a plurality of surface sub-portions. The surface sub-portions each comprise a number of vertices, and each vertex is assigned by a ranking value. The processor unit (52) is further configured to identify at least one vertex of vertices adjacent to the determined point of interest as an intended vertex. The identification is based on a function of a detected proximity distance to the point of interest and the assigned ranking (Continued)

value. The output unit (54) is configured to provide a visual presentation of the 3D surface model. The interface unit (56) is configured to determine a point of interest in the visual presentation of the 3D surface model by interaction of a user. The interface unit 56 is further configured to modify the 3D surface model by displacing the intended vertex by manual user interaction. In an example, the output unit (54) is a display configured to display the 3D surface model directly to the user (58).

15 Claims, 7 Drawing Sheets

(56) References Cited

U.S. PATENT DOCUMENTS

| | | | |
|---|---|---|---|
| 8,411,080 B1* | 4/2013 | Zimmermann | G06T 19/20 345/419 |
| 8,554,573 B2 | 10/2013 | Pekar | |
| 8,699,787 B2 | 4/2014 | van den Hengel et al. | |
| 2006/0177133 A1 | 8/2006 | Kee | |
| 2007/0133848 A1* | 6/2007 | McNutt | G06K 9/209 382/128 |
| 2008/0097941 A1* | 4/2008 | Agarwal | G06N 20/00 706/12 |
| 2008/0225044 A1* | 9/2008 | Huang | G06T 17/00 345/420 |
| 2009/0279754 A1* | 11/2009 | Gindele | G06T 7/11 382/128 |
| 2009/0279756 A1* | 11/2009 | Gindele | G06T 19/00 382/128 |
| 2010/0142787 A1* | 6/2010 | Zheng | G06K 9/3241 382/131 |
| 2011/0157042 A1 | 6/2011 | Li | |
| 2012/0088981 A1* | 4/2012 | Liu | G06K 9/6215 600/300 |
| 2013/0002646 A1* | 1/2013 | Lin | G06T 7/0012 345/419 |
| 2013/0038540 A1 | 2/2013 | Anderson | |
| 2013/0050208 A1* | 2/2013 | Lin | G06T 17/20 345/420 |
| 2013/0124148 A1* | 5/2013 | Jin | G06F 17/5086 703/1 |
| 2013/0135305 A1 | 5/2013 | Bystrov et al. | |
| 2014/0198979 A1* | 7/2014 | Hamarneh | A61B 6/03 382/154 |
| 2014/0210816 A1* | 7/2014 | Zimmermann | G06T 19/20 345/420 |
| 2015/0036901 A1* | 2/2015 | Hibbard | G06T 17/30 382/128 |

FOREIGN PATENT DOCUMENTS

| | | |
|---|---|---|
| WO | 2005078666 | 8/2005 |
| WO | 2007034425 A3 | 3/2007 |
| WO | 2012017375 A2 | 2/2012 |
| WO | 20130135305 A1 | 9/2013 |

* cited by examiner

MEDICAL IMAGE EDITING

FIELD OF THE INVENTION

The present invention relates to medical image editing, and in particular to a medical image editing device, to a medical imaging system, to a method of editing a medical 3D surface model, to a computer program element, and to a computer-readable medium.

BACKGROUND OF THE INVENTION

Medical image editing, for example, medical image segmentation, is a procedure for dealing with the information provided by medical images. It plays an important role for surgical planning and simulation, radiotherapy planning, and tracking the progress of disease. Computers are used in medical image editing for providing, for example, automated image segmentation. WO 2007/034425 A3 relates to a method of adapting a geometric model to image data using multiple partial transformations. However, to ensure accuracy and precision, especially for the medical images with low contrast, noise, and other imaging ambiguities, medical image editing as performed by trained medical personnel, such as a radiologist, can become tedious.

SUMMARY OF THE INVENTION

There may be a need to have an improved technique that facilitates the medical image editing process.

The object of the present invention is solved by the subject-matter of the independent claims, wherein further embodiments are incorporated in the dependent claims. It should be noted that the following described aspects of the invention apply also for the medical image editing device, the medical imaging system, the method of editing a medical 3D surface model, the computer program element, and the computer-readable medium.

According to the present invention, a medial image editing device is provided that comprises a processor unit, an output unit and an interface unit. The processor unit is configured to provide a 3D surface model of an anatomical structure of an object of interest. The 3D surface model comprises a plurality of surface sub-portions. The surface sub-portions each comprise a number of vertices. Each vertex is assigned a ranking value. The processor unit is configured to identify at least one vertex of vertices adjacent to the determined point of interest as an intended vertex. The identification is based on a function of the detected proximity distance to the point of interest and the assigned ranking value.

As an advantage, the present invention facilitates finding and picking the intended vertex of a 3D surface model, e.g. the reference vertex in the set of vertices to be transformed, by a user, e.g. medical personnel. The identification of the intended vertex is based on the detected proximity distance and the assigned ranking value. This enables a user to grab the intended vertex without great effort during editing in a 3D viewer, even when occlusion prohibits the visibility in a 3D mesh viewer. Likewise, in 2D views with contours, even when the intended vertex is not visible in the current viewing plane—but lies in front of or behind it, the user can still grab it easily. This reduces the manual effort in the interactive editing step and thus improves the workflow.

According to an example, the ranking value is associated with different ranking categories comprising at least one of the group of: forming a corner, being part of a junction, degree of relative curvature, and anatomical meaning.

According to a further example, the processor unit is further configured to provide a 2D medical image of the object of interest, and to overlay a 2D representation of a section though the 3D surface model over the 2D medical image as a combined 2D image. The 2D representation and the 2D medical image are registered to each other. The processor unit is also configured to indicate a matching point of interest in the combined 2D image. The processor unit is also configured to provide the modifying also by displacing the indicated matching point in the combined 2D image.

According to the invention, also a medical imaging system is provided, comprising a medical image acquisition device and a medical image editing device according to one of the above-mentioned examples. The medical image acquisition device is configured to provide image data for the modifying of the 3D surface model.

According to the invention, also a method of editing a medical 3D surface model is provided, the method comprising the following steps:
a) Providing a 3D surface model of an anatomical structure of an object of interest. The 3D surface model comprises a plurality of surface sub-portions. The surface sub-portions each comprise a number of vertices, and each vertex is assigned a ranking value.
b) Determining a point of interest in a visual presentation of the 3D surface model by interaction of a user.
c) Identifying at least one vertex of vertices adjacent to the determined point of interest as an intended vertex. The identifying is based on a function of a detected proximity distance to the point of interest and the assigned ranking value.
d) Modifying the 3D surface model by displacing the intended vertex by manual user interaction.

According to an example, step c) comprises choosing the intended at least one vertex as a point of modification of the 3D surface model by user interaction.

According to an example, in step c) a proximity threshold is provided. The identifying comprises identifying vertices within the proximity threshold of the determined position.

According to a further example, in step c), the identifying is provided automatically as an auto-snap function of the 3D surface model.

According to a further example, before step c), the user can select one or more of the ranking categories to be applied for the identifying in step c).

According to a further example, in step a), the assigned ranking value comprises an assigned numerical label relating to the surface sub-portions in dependency of an associated category. Following step b), it is provided: b1) selecting a numerical label to for the identifying; and in step c), it is provided a sub-step of c1) identifying the intended vertex with a matching numerical label.

According to a further example, in step a), the assigned ranking values comprise an assigned anatomical label relating to the surface sub-portions in dependency of an associated category. Following step b), it is provided: b1) determining an anatomical label to for the identifying; and in step c), it is provided a sub-step of c1) identifying the intended vertex with a matching anatomical label.

According to a further example, step c) further comprises: c3) displaying the identified intended vertex. The identified intended vertex is visually highlighted. Step d) further comprises:
d1) displaying the modified 3D surface model.

According to a further example, in step a) it is further provided: a1) providing a 2D medical image of the object of interest; and a2) overlaying a 2D representation of a section though the 3D surface model over the 2D medical image as a combined 2D image. The 2D representation and the 2D medical image are registered to each other. In step b), a matching point of interest is indicated in the combined 2D image; and in step d), the modifying is also provided by displacing the indicated matching point in the combined 2D image.

In the present invention, the term "medical 3D surface model" relates to a model of an anatomical structure relating to a specific organ, or a general shape of areas of interest that could correspond to radiotherapy treatment of interest, for example, a tumour shape to be treated with radiation.

The term "3D surface model" relates to a geometric representation of a three-dimensional (3D) structure or volume by employing its surface or outer contour. For example, the 3D surface model is defined as a set of polygons describing a surface. The polygons may be triangles and represented by a flexible triangular mesh.

The 3D surface model may be provided as a basic structural model that is then adapted to a patient's situation by the user interaction. The 3D surface model may also be provided as a previously adapted patient model, which is now further adapted to match the current situation. As an example, the 3D surface model may be used as a template, e.g. for the MR segmentation of the human brain.

The term "object of interest" or "region of interest" relates to an anatomic structure of a patient, which may correspond to different tissue classes, organs, pathologies, or other biologically relevant structures. The object may thus be, for example, brain, heart, lungs, liver, retinal arteries, and even cellular structures such as neurons and chromosomes. The term object of interest may also relate to pathological regions of a patient, such as cancer, tumour, tissue deformities, and multiple sclerosis lesions.

The term "vertex (vertices)" relates to a set of points that are connected by linking lines or surfaces. In case of 3D surface model being represented by a set of polygons, the vertices are a list of points in a three-dimensional space, which points connect the polygons and their edges.

The term "sub-portion" relates to a part or fragment of the structure or volume, i.e. a part or a region of the 3D surface model.

The term "ranking value" relates to an assigned or associated value used for further selecting by applying a ranking in order to provide a selection.

The determination of a point of interest and the following identification of a vertex can also be referred to as selecting a spatial location (of the model) resulting in a selected position.

The term "selected position" may thus relate to a position direct on the 3D surface model, e.g. on the 3D triangular surface mesh of the object. The term "selected position" may also relate to a position on a give image slice with an overlaid in-plane contour of the geometric model (see below).

The term "proximity" relates to a relative distance between the determined point and a vertex, i.e. a point-to-point distance.

It is noted that a patient or a medical image does not need to be present for the invention, since it is applied to a 3D surface model.

According to an aspect, an auto-snapping feature of a mesh editing application, for example, a model-based segmentation using a shape-constrained surface model is provided. Based on the selected position by a user on the 3D surface model, for example, by a user's mouse click, the intended vertex or vertices, i.e. the vertex or vertices to be transformed, is identified not only via their distance to the selected position, but also via their individual properties. The individual properties may comprise local mesh features, such as connectedness, i.e. junctions, or curvature, i.e. corners. The individual properties may also comprise anatomical meaning of the vertex position including, for example, a standard landmark, such as the anterior commissure in brain scans, or a medical or physiological meaning, e.g. vertices of part of a lesion. This approach may also be considered as a "snap-to-reference-vertex" functionality. The identified intended vertex or the reference vertex can be used as the basis vertex for mesh deformations, which can be "grabbing", "pulling", "locally bending", or "moving".

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
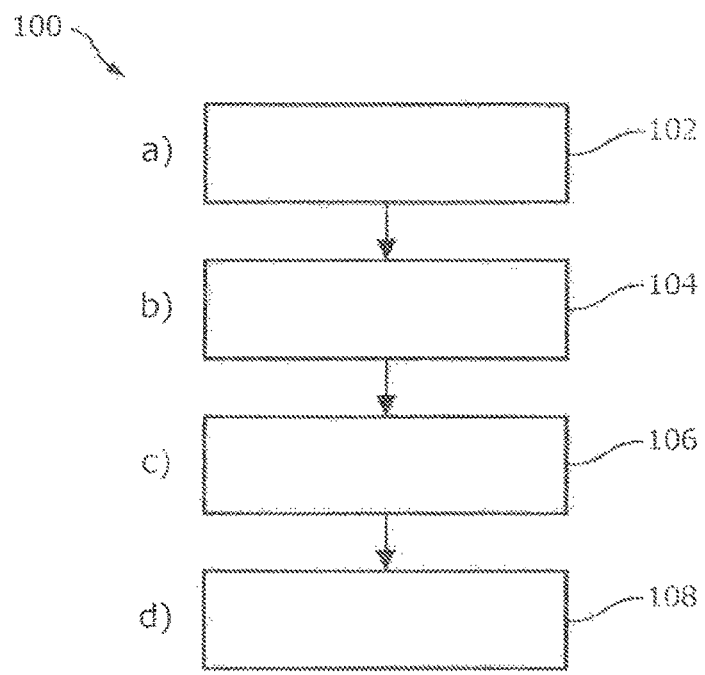
FIG. 1 shows an example of basic method steps of a method for editing a medical 3D surface model.
Figure 2:
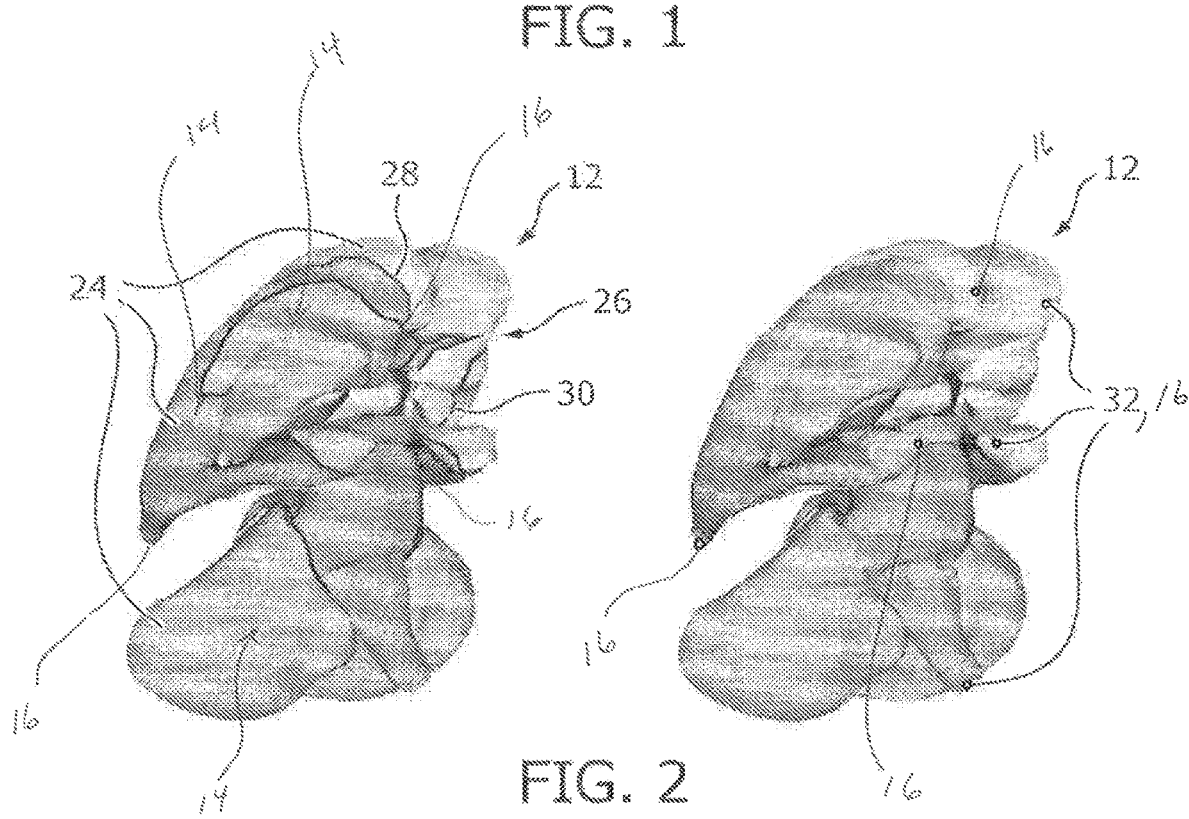
FIG. 2 shows an example of a 3D surface model.
Figure 7:
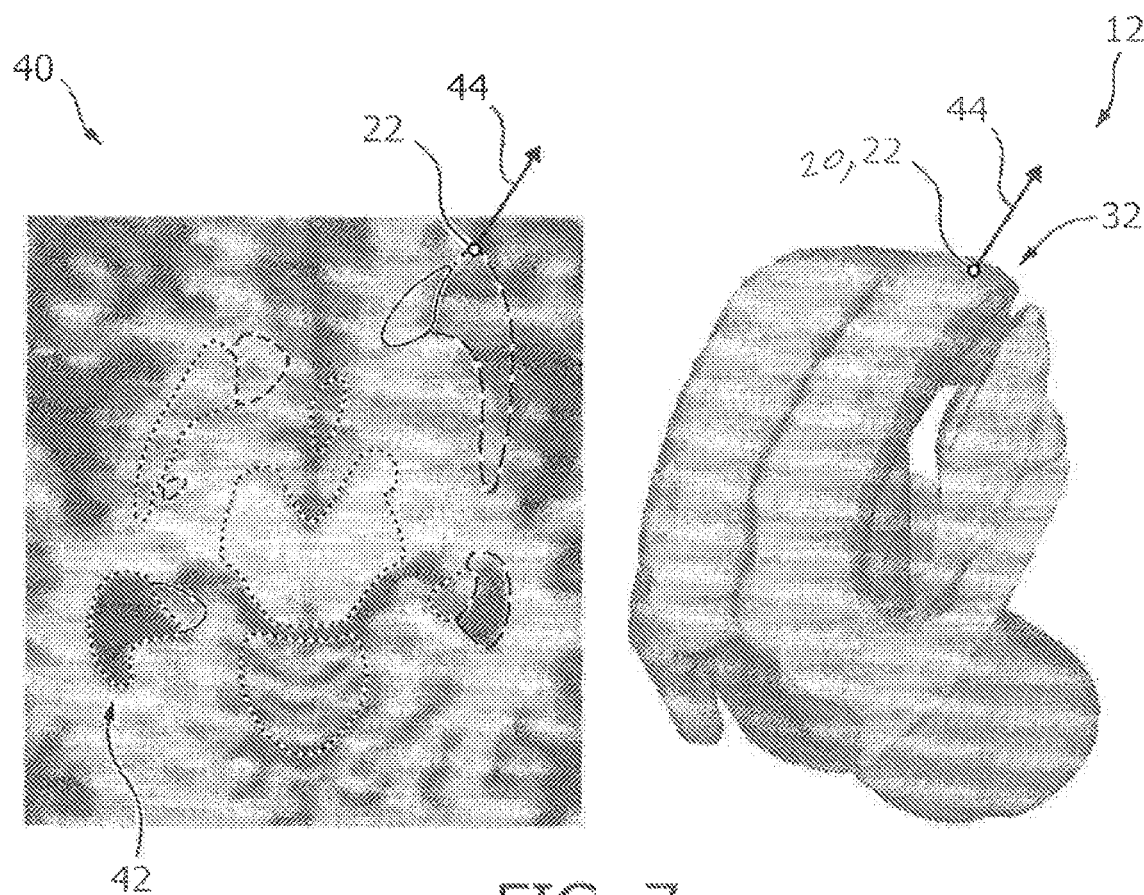
FIG. 7 shows an example of the model editing operation in FIG. 6.

FIG. 1 shows basic steps of a method 100 for editing a medical 3D surface model, with reference also to FIGS. 2 and 7. The method 100 comprises the following steps:

In a first step 102, also referred to as step a), a 3D surface model 12 of an anatomical structure of an object of interest is provided. The 3D surface model 12 comprises a plurality of surface sub-portions 14. The surface sub-portions 14 each comprise a number of vertices 16. Each vertex 16 is assigned a ranking value.

In a second step 104, also referred to as step b), a point of interest 20 in a visual presentation of the 3D surface model 12 is determined by interaction of a user.

In a third step 106, also referred to as step c), at least one vertex of vertices adjacent to the determined point of interest 20 is identified as an intended vertex 22. The identifying is based on a function of a detected proximity distance 23 to the point of interest 20 and the assigned ranking value.

In a fourth step 108, also referred to as step d), the 3D surface model 12 is modified by displacing the intended vertex 22 by manual user interaction. FIG. 2 shows an example of a 3D surface model 12 of a sub-cortical brain structure. The 3D surface model 12 comprises a plurality of sub-structures 24, such as corpus callosum, ventricles, putamen, or globus pallidus. These sub-structures 24 are connected at junctions 26, indicated with lines. For example, the junction connecting the corpus callosum and the ventricles is indicated with a dotted line 28. The putamen and the globus pallidus are connected at the junction indicated with a dash line 30. In addition, there are "corners" 32 (shown as dots), which have a locally high curvature. These sub-structures 24, junctions 26, and corners 32 are also referred to as the surface sub-portions 14 of the 3D surface model 12.

In the manual editing step, some parts of the surface sub-portions 14 are more attractive or relevant for manual or interactive editing including, for example, the junctions 26 and the corners 32. Therefore, in the first step 102, i.e. in step a), the vertices 16 of these surface sub-portions 14, i.e. the junctions 26 and the corners 32, may be assigned a different ranking value.

Now referring to FIGS. 1 and 7, in the third step 106, i.e. in step c), there is a variety of functions of combining the detected proximity distance 23 to the point of interest 20 and the assigned ranking value for identifying the intended vertex 22. For example, the function may be defined as:

$$d*L$$

where d is the detected proximity distance, and L is the ranking value.

In an example, the vertices 16, which are more relevant for manual editing, such as the vertices of the junctions 26 and corners 32 in FIG. 2, are assigned a ranking value of 0.1 (L=0.1), whereas others are assigned a ranking value of 1 (L=1). In this way, the vertices 16 of the junctions 26 and corners 32, for example, will be picked as the intended vertex 22, even though the distance to the closest non-corner and non-junction vertex is 9 times lower.

The modifying in step d) may comprise an adapting or deforming of the 3D surface model for editing purposes. For example, the modifying is provided in order to better adapt the (more abstract or more generalized or simplified) 3D surface model to a current situation (e.g. of the patient).

The term "to deform" relates to geometrical transformation of the 3D surface model globally, i.e. the whole 3D surface model, or locally, i.e. one or a plurality of surface sub-portions. The geometrical transformation may be a translation, a rotation, an elastic warping, a stretching, or another form of transformation.

In an example, the modification is provided in order to match the 3D surface model with a region of interest. The term "to match" means that the 3D surface model is geometrically deformed until the 3D surface model conforms to a region of the object's surface, for example, in the image representation (see also below).

The modification is thus an editing of the 3D volume by editing, for example, the 3D mesh representing the 3D surface model.

As an example, the modifying (or) deforming of the 3D surface model is provided as a Gaussian transformation.

According to the method described above, an intended vertex is identified based on its proximity to the selected point on the 3D surface model and the ranking value, and then used as a basis vertex to modify the 3D surface model, for example, for precisely matching image data. In a manual editing step, some parts of the 3D surface model are usually more attractive for interacting editing, such as 3D junctions, at which two or more regions are connected, or 3D "corners" that have locally high curvature. The user, such as medical personnel, typically picks an intended vertex from the attractive parts and deforms the 3D surface model by "grabbing", "pulling", "locally bending", or "moving" with the mouse, for example. However, in a 3D mesh viewer, grabbing intended vertex or point may be tedious since the view of the intended vertex may be blocked. This happens also in 2D view since the intended vertex may not be visible in the current viewing plane. By assigning the vertices of these attractive parts with different ranking values, the intended vertices can be found even when invisible to the user. When the user selects the point on the 3D surface model, for example, by a mouse click, the intended vertices of the attractive parts closer to the selected position is identified. This method thus reduces the manual effort for searching the intended vertex for medical image editing and improves the workflow.

In an example, the ranking value 18 belongs to different ranking categories comprising at least one of the group of: forming a corner, being part of a junction, degree of relative curvature, and anatomical meaning.

The term "forming a corner" relates to a point that defines a corner of a volume.

The term "being part of a junction" relates to a point that belongs to two different sub-portions or sub-structures that meet each in form of a junction.

The "degree of relative curvature" relates to a vertex that defines a curved structure (line or edge) in its curve-related characteristic. For example, a stronger bending line has a larger degree of curvature than a softer bending line, or, in other words, a small radius leads to a circular arch with a larger degree of curvature than a large radius. However, the degree of curvature also relates to a number of the curves, i.e. the number of separated curved segments.

The term "anatomical meaning" relates to standard anatomic landmarks, i.e. an anatomic feature serving to indicate a specific structure or position, such as bones, muscles, and blood vessels. The term "anatomical meaning" may also relate to the sub-regions of an organ, such as the white matter, gray matter, and the cerebrospinal fluid spaces of the brain.

In an example, the "anatomical meaning" also relates to medical/physiological meaning, which also provides the possibility to assign patient-related aspects. The term "medical/physiological meaning" relates to pathological regions, such as cancer, tissue deformities, or multiple sclerosis lesions.

In a further example, the step c) further comprises choosing the intended at least one vertex as a point of modification of the 3D surface model by user interaction. In a further example, a proximity threshold is provided. The identifying comprises identifying vertices 16 within the proximity threshold of the determined point of interest 20.

In other words, the intended vertex 22 is searched within a maximum distance of the proximity threshold. The proximity threshold may be a fixed value. The proximity threshold may also depend on the current field of view, i.e. currently viewed image plane of a volumetric image.

In a further example, in step c), the identifying is provided automatically as an auto-snap function of the 3D surface model.

The auto-snap function is also referred to as "snap-to-reference vertex function" or "snap-according-to-ranking-value function". For example, once the intended vertex 22 is identified or chosen, the intended vertex 22 is automatically picked by a cursor. In a further example, before step c), the user can select one or more of the ranking categories to be applied for the identifying in step c).

For example, a context menu may be provided, which allows a user to select respective ranking categories including, for example, "edge points", "junction points", "anatomical landmarks" and/or "pathological region". In this way, the user can further constrain the list of candidate vertices of the intended vertex, thus preventing picking the wrong intended vertex.

Figure 3:
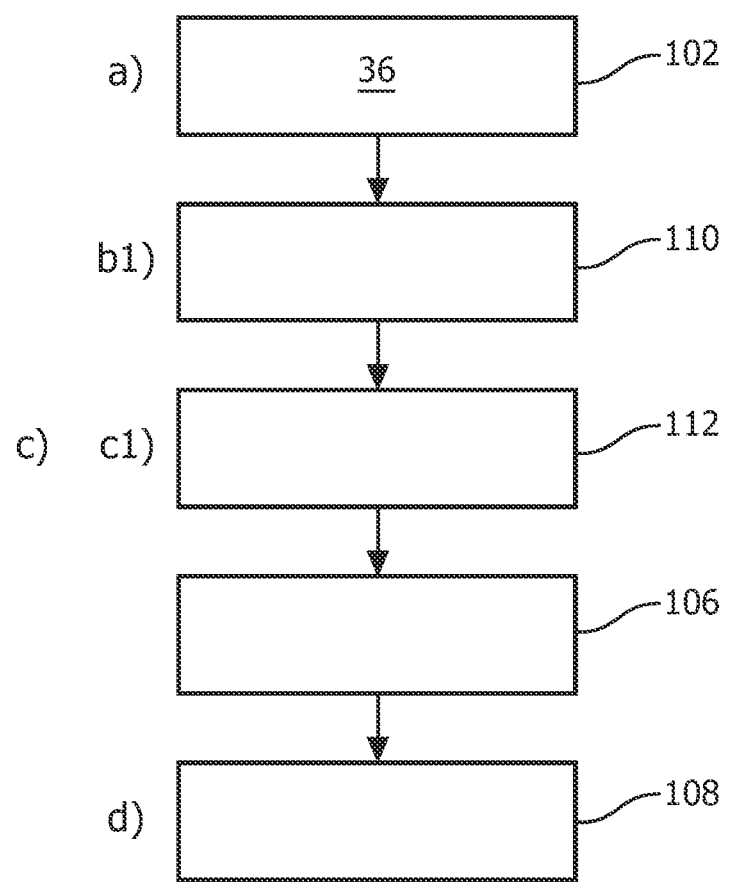
FIG. 3 shows a further example of a method.

According to a further exemplary embodiment, as shown in FIG. 3, in step a), the assigned ranking value comprises an assigned numerical label relating to the surface sub-portions 14 in dependency of an associated category. Following step b), it is provided a step 110, also referred to as step b1), in which the assigned numerical label is selected for the identifying. In step c), it is provided a sub-step 112, also referred to as step c1), in which the intended vertex 22 is identified with a matching assigned numerical label.

In this way, only the vertices 16 of relevant surface sub-portions 14, such as the junctions 26, and the corners 32 in FIGS. 2A and 2B, are selected. Further, the vertices 16 of a particular sub-structure 24, such as a tumour, may also be identified.

Figure 4:
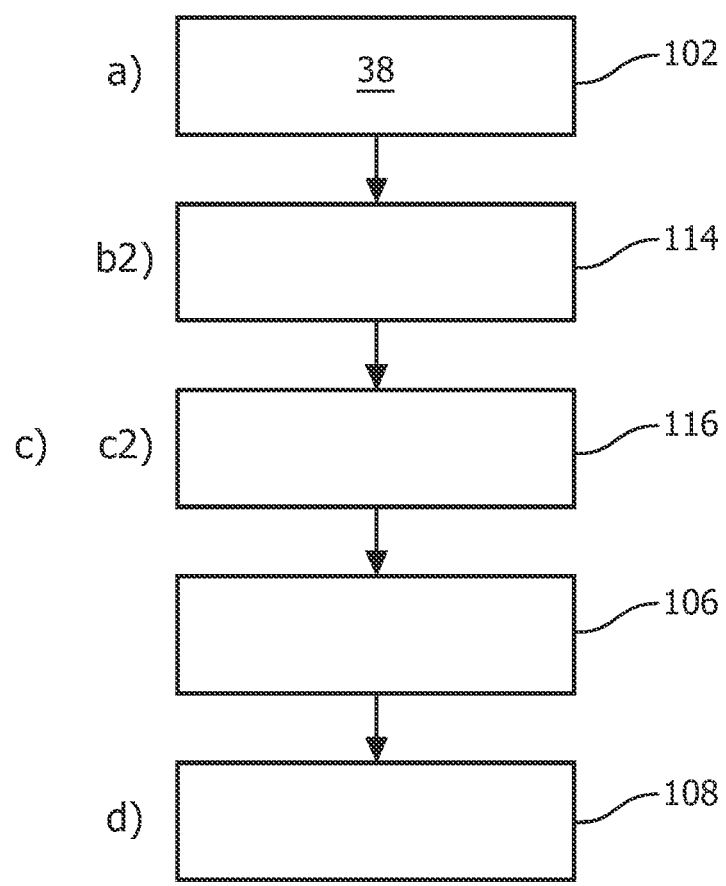
FIG. 4 shows a still further example of a method.

According to a further exemplary embodiment, as shown in FIG. 4, the assigned ranking value comprises an assigned anatomical label relating to the surface sub-portions 14 in dependency of an associated category. Following step b), it is provided a step 114, also referred as step b2), in which the assigned anatomical label is determined for the identifying. In step c), it is provided a sub-step 116, also referred to as step c2), in which the intended vertex 22 is identified with a matching assigned anatomical label.

This ensures that the selection or identification of the intended vertex is constrained to the user-selected anatomical regions, for example, to prevent picking a putamen instead of a globus pallidus point in FIG. 2.

Figure 5:
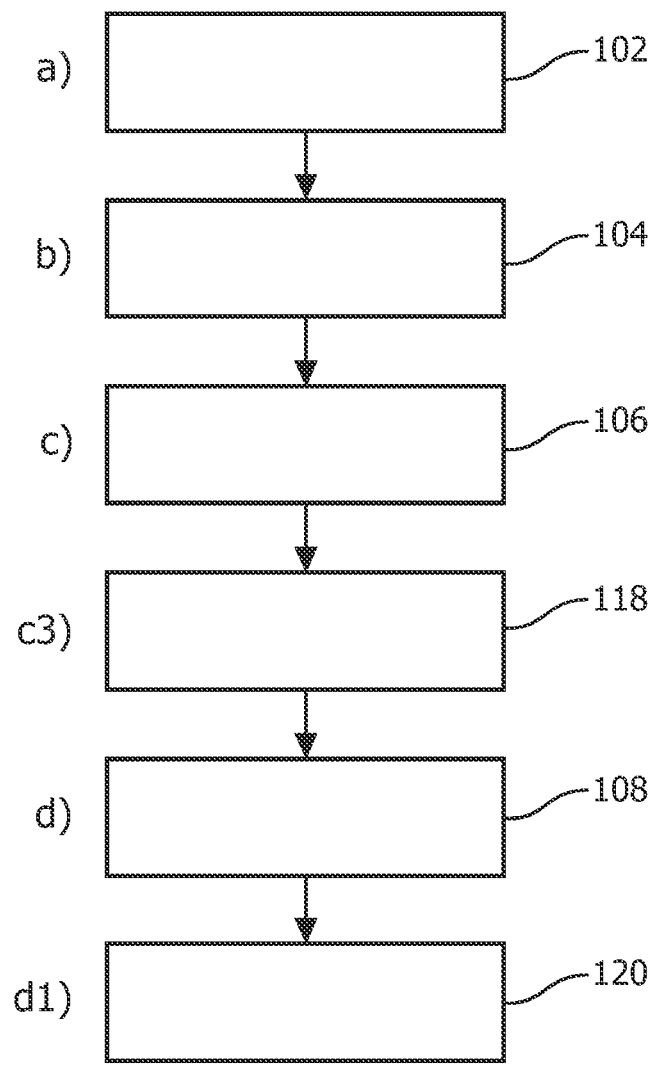
FIG. 5 shows a further example of a method.

According to a further exemplary embodiment, as shown in FIG. 5, the step c) further comprises: c3) displaying 118 the identified intended vertex 22, which is visually highlighted; and step d) further comprises: d1) displaying 120 the modified 3D surface model.

In step c3), the visually highlighting may be provided as colour coding, contrast enhancement, brightness enhancement, or providing patterns for identification, or blinking or flashing of the identified intended vertex.

Figure 6:
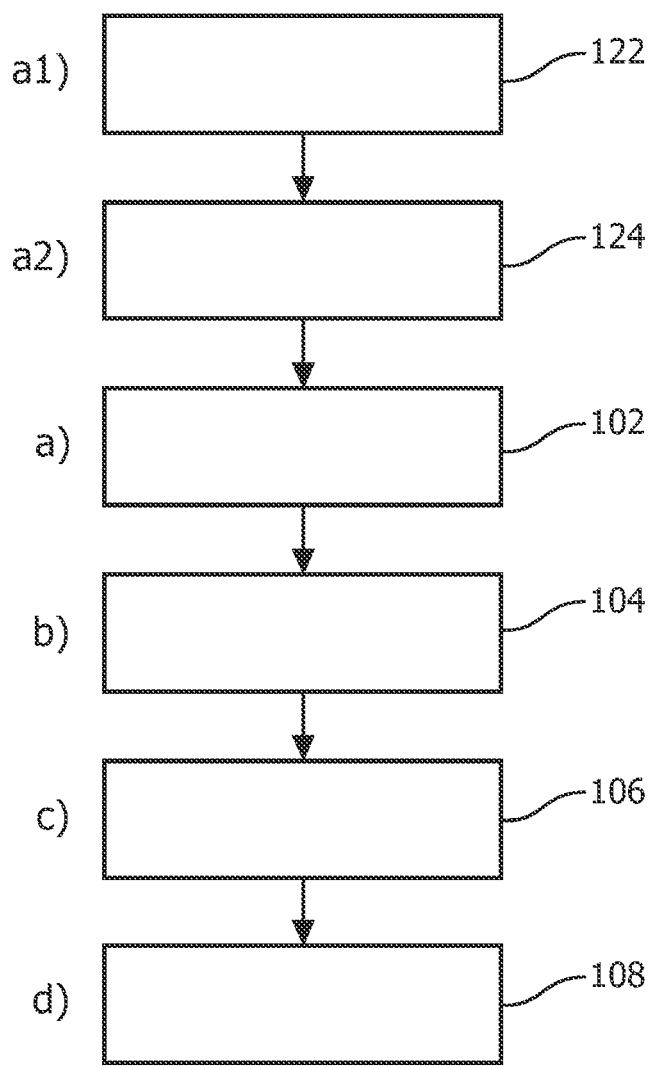
FIG. 6 shows a still further example of a method.

It will be appreciated that the display of the identified intended vertex in step c3) and the display of the 3D surface model in step d1) may be via a computer screen, television monitor, head mounted screen, or alternatively the display may be transmitted over a computer network or audio visual distribution system to another display, or means. According to a further exemplary embodiment, as shown in FIG. 6, in step a) it is further provided: a1) providing 122 a 2D medical image 40 of the object of interest; and a2) overlaying 124 a 2D representation of a section 42 though the 3D surface model over the 2D medical image as a combined 2D image. The 2D representation of the section 42 and the 2D medical image 40 are registered to each other. In step b), a matching point of interest 20 is indicated in the combined 2D image; and in step d), the modifying is also provided by displacing the indicated matching point in the combined 2D image.

The term "medical image" relates to images generated by medical imaging modalities, such as X-ray imaging modalities, for example a C-arm or CT (computed tomography), or as magnetic resonance (MR) imaging modalities, or ultrasound imaging modalities. Besides one type of images, the medical image may also relate to a combination of images from several sources. An example is a combination of CT and PET images to combine structural and metabolic information. The medical image may also relate to integrated images over time, which are also referred to as 4D image data sets, such as MRI, inhale and exhale CT, or 4D CT, for example, for tracking a non-rigid motion of an anatomical structure.

The term "2D representation of a section" relates to an in-plane contour of the 3D surface model representing the object boundary overlaid on a given image slice, which image slice, for example, is provided for evaluating the volumetric image set on a slice by slice basis, such as an axial, coronal or sagittal slice view. For example, the in-plane contour may be obtained by solving the line-plane equation between the viewed image plane and the edges of the 3D surface mesh intersecting with the image plane.

FIG. 7 shows an example of the model editing operation in FIG. 6. The 2D medical image 40 (left in FIG. 7) is provided as a cross-section view of a sub-cortical brain structure, with the 2D representation of the section 42, i.e. the contour overlaid on the 2D medical image 40. On the right side is the 3D surface model 12 of the sub-cortical brain structure. The intended vertex 22 is identified according to one of the above-mentioned examples, for example, by mouse click close to the 3D corner 32 on the right putamen. The identified intended vertex 22 is then highlighted, such as with colour coding, or contrast enhancement in the 3D surface model 12 and the 2D representation of the section 42. In case that the intended vertex 22 is not in the current viewing plane, the 2D viewing plane may be adjusted so that the intended vertex 22 is marked and clearly visible after the identification, for example, by changing the current view that the user is operating with, by providing a "thumbnail" view next to the main view, or by any other suitable methods. The user can achieve the modification directly on the 3D surface model 12, e.g. by pulling the intended vertex 22, indicated as an arrow 44 in FIG. 7. Alternatively, the user can displace the intended vertex 22 in the combined 2D medical image 40 in the modified viewing plane, or in the thumbnail view.

Figure 8:
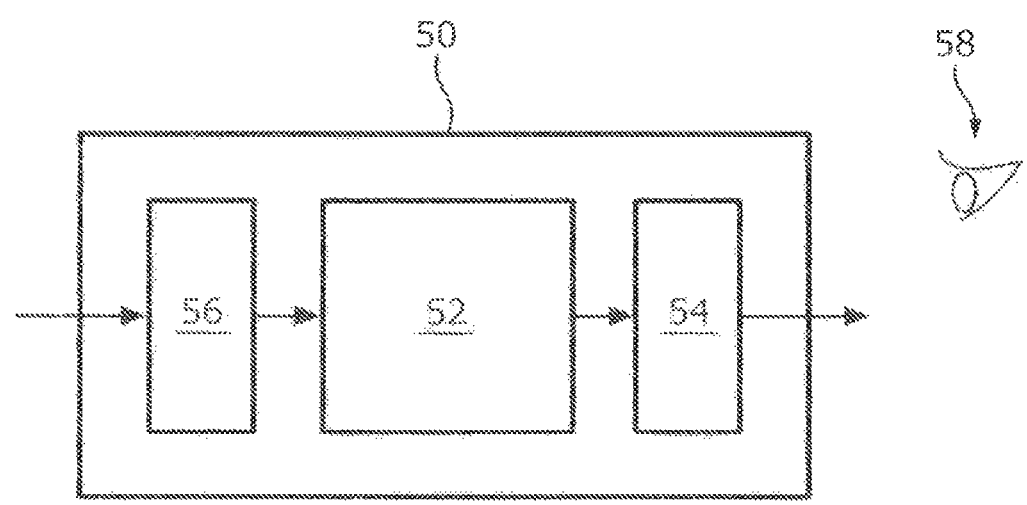
FIG. 8 shows a medical image editing device according to an example.

FIG. 8 shows a medical image editing device 50 according to an exemplary embodiment of the invention. The medical image editing device 50 comprises a processor unit 52, an output unit 54, and an interface unit 56. The processor unit 52 is configured to provide a 3D surface model of an anatomical structure of an object of interest. The 3D surface model comprises a plurality of surface sub-portions. The surface sub-portions each comprise a number of vertices, and each vertex is assigned by a ranking value. The processor unit 52 is further configured to identify at least one vertex of vertices adjacent to the determined point of interest as an intended vertex. The identification is based on a function of a detected proximity distance to the point of interest and the assigned ranking value. The output unit 54 is configured to provide a visual presentation of the 3D surface model. The interface unit 56 is configured to determine a point of interest in the visual presentation of the 3D surface model by interaction of a user. The interface unit 56 is further configured to modify the 3D surface model by displacing the intended vertex by manual user interaction. In an example, the output unit 54 is a display configured to display the 3D surface model directly to the user 58.

In an example, medical images or image data does not need to be present for the medical image editing device 50, since it is applied to a 3D surface model.

According to a further exemplary embodiment, the processor unit 52 of the medical image editing device 50 is configured to provide a 2D medical image of the object of interest. The processor unit 52 is further configured to overlay a 2D representation of a section though the 3D surface model over the 2D medical image as a combined 2D image.

The 2D representation and the 2D medical image are registered to each other. The processor unit 52 is further configured to indicate a matching point of interest in the combined 2D image. The processor unit 52 is further configured to provide the modifying also by displacing the indicated matching point in the combined 2D image.

Figure 9:
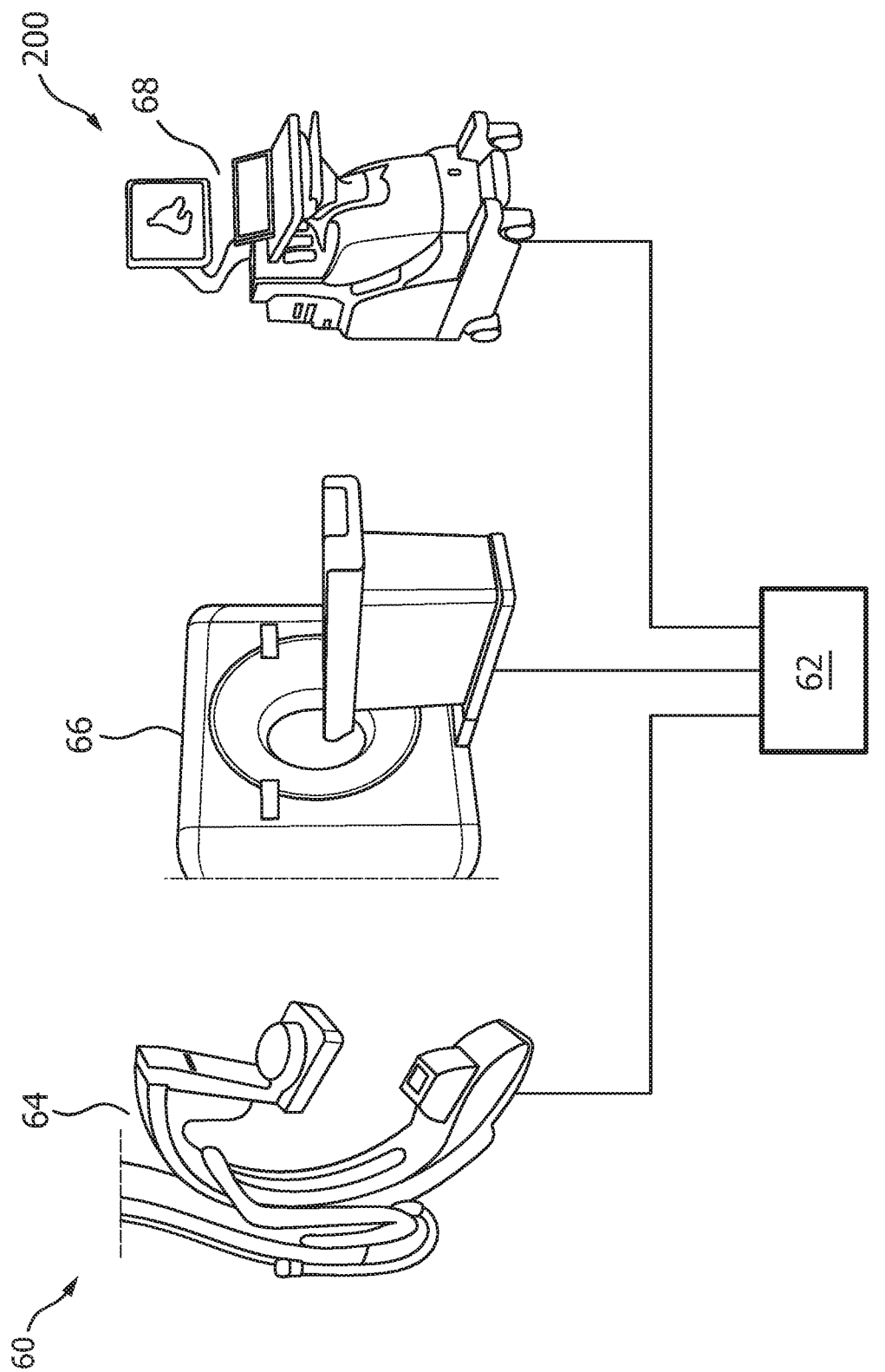
FIG. 9 shows a medical imaging system according to an example.

FIG. 9 shows a medical imaging system 200 according to an exemplary embodiment of the invention, comprising a medical image acquisition device 60 and a medical image editing device 62 according to one of the examples described before. The medical image acquisition device 60 is configured to provide image data for the modifying of the 3D surface model 12.

In an example, the medical image acquisition device 60 is provide as at least one of the group of:
- an X-ray image acquisition device, such as a computer tomography (CT) device or a C-arm device 64;
- a magnetic resonance (MR) device 66;
- a transesophageal Echocardiogram (TEE) device 68;
- an ultrasound device (not further shown);
- a positron emission tomography (PET) device (not further shown); and
- a single-photo emission computer tomography (SPECT) device (not further shown).

The term "image data" relates to data or signals provided by the medical image acquisition device 60. These data have usually undergone no or only a limited pre-processing and do typically not directly correspond to a medical image, such as a cross-section view, of the body portion.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A medical image editing device, comprising:
   a processor unit programmed to provide a 3D surface model of an anatomical structure of an object of interest, the 3D surface model comprising a plurality of surface sub-portions corresponding to regions of the anatomical structure, and each of the surface sub-portions comprising a plurality of vertices assigned ranking values, respectively;
   an output unit configured to provide a visual presentation of the 3D surface model; and
   an interface unit configured to determine a point of interest in the visual presentation of the 3D surface model by interaction of a user;
   wherein the processor unit is further programmed to identify a vertex of the plurality of vertices, adjacent to the point of interest, as an intended vertex based on a function of a detected proximity distance of each vertex to the point of interest and the assigned ranking value of each vertex; and
   wherein the interface unit is further configured to modify the 3D surface model by displacing the intended vertex by manual user interaction.

2. The medical image editing device according to claim 1, wherein the ranking value is associated with different ranking categories comprising at least one of the group of:
- forming a corner;
- being part of a junction;
- degree of relative curvature; and
- anatomical meaning.

3. The medical image editing device according to claim 1, wherein the processor unit is further programmed to:
- provide a 2D medical image of the object of interest; and
- to overlay a 2D representation of a section though the 3D surface model over the 2D medical image as a combined 2D image, wherein the 2D representation and the 2D medical image are registered to each other;
- indicate a matching; and
- provide the modifying also by displacing the indicated matching point in the combined 2D image.

4. A medical imaging system, comprising:
- a medical image acquisition device; and
- a medical image editing device according to claim 1;
  - wherein the medical image acquisition device is configured to provide image data for the modifying of the 3D surface model.

5. A method of editing a medical 3D surface model, the method comprising:
- a) providing a 3D surface model of an anatomical structure of an object of interest, wherein the 3D surface model comprises a plurality of surface sub-portions corresponding to regions of the anatomical structure, wherein the surface sub-portions each comprise a plurality of vertices, and wherein each vertex of the vertices is assigned a ranking value;
- b) determining a point of interest in a visual presentation of the 3D surface model by interaction of a user;
- c) identifying a vertex of the plurality of vertices, the vertex being adjacent to the point of interest, as an intended vertex, wherein identifying the intended vertex is based on a function of a detected proximity distance to the point of interest and the assigned ranking value; and
- d) modifying the 3D surface model by displacing the intended vertex by manual user interaction.

6. The method according to claim 5, wherein c) comprises choosing the intended vertex as a point of modification of the 3D surface model by the manual user interaction.

7. The method according to claim 5, wherein in c) a proximity threshold is provided; and identifying the intended vertex comprises identifying at least one vertex within the proximity threshold of the determined position.

8. The method according to claim 5, wherein, in c), identifying the intended vertex is provided automatically as an auto-snap function of the 3D surface model.

9. The method according to claim 5, wherein, before c), selecting by the user of one or more of the ranking values to be applied for identifying the intended vertex in c).

10. The method according to claim 5,
wherein, in a), the assigned ranking value comprises an assigned numerical label relating to the surface sub-portions in dependency of an associated category; and
wherein, after b) the method further comprises:
b1) selecting a numerical label to for identifying the intended vertex; and
wherein, in c),
c1) the intended vertex is identified with a matching numerical label.

11. The method according to claim 5,
wherein, in a), the assigned ranking value comprises an assigned anatomical label relating to the surface sub-portions in dependency of an associated category; and
wherein, after b), the method further comprises:
b2) determining an anatomical label to for identifying the intended vertex; and
wherein, in c),
c2) the intended vertex is identified with a matching anatomical label.

12. The method according to claim 5,
wherein c) further comprises:
c3) displaying the identified intended vertex; wherein the identified intended vertex is visually highlighted; and
wherein d) further comprises:
d1) displaying the modified 3D surface model.

13. The method according to claim 5
wherein in a) the method further comprises:
a1) providing a 2D medical image of the object of interest; and
a2) overlaying a 2D representation of a section though the 3D surface model over the 2D medical image as a combined 2D image, wherein the 2D representation and the 2D medical image are registered to each other;
wherein in b), a matching point of interest is indicated in the combined 2D image; and
wherein in d), the modifying is also provided by displacing the indicated matching point in the combined 2D image.

14. A computer program element comprising instructions to control an apparatus, which, when being executed by a processing unit, is adapted to perform the method steps of claim 5.

15. A non-transitory computer readable medium having stored thereon instructions that, when executed by a processor, causes the processor to perform a method comprising:
providing a 3D surface model of an anatomical structure of an object of interest, wherein the 3D surface model comprises a plurality of surface sub-portions corresponding to regions of the anatomical structure, wherein the surface sub-portions each comprises a plurality of vertices, and wherein each vertex of the vertices is assigned a ranking value;
determining a point of interest in a visual presentation of the 3D surface model by interaction of a user;
identifying a vertex of the plurality of vertices, the vertex being adjacent to the point of interest, as an intended vertex, wherein identifying the intended vertex is based on a function of a detected proximity distance to the point of interest and the assigned ranking value; and
enabling the 3D surface model to be modified by displacing the intended vertex by manual user interaction.

* * * * *